United States Patent [19]
Rushing

[11] Patent Number: 5,787,698
[45] Date of Patent: Aug. 4, 1998

[54] HIGH-REACH FRUIT PICKER

[76] Inventor: S. Everett Rushing, 5417 Robinson Rd. Ext., Jackson, Miss. 39204

[21] Appl. No.: 698,692

[22] Filed: Aug. 16, 1996

[51] Int. Cl.$^6$ .............................. A01D 11/00; A01D 46/24
[52] U.S. Cl. .................................................. 56/332; 56/339
[58] Field of Search .............................. 56/332, 331, 333, 56/334, 337, 339, 340

[56] References Cited

U.S. PATENT DOCUMENTS

| 67,296 | 7/1867 | Gurnee ........................................ 56/332 |
| 186,921 | 2/1877 | Boyd . |
| 370,004 | 9/1887 | Bruner . |
| 589,009 | 8/1897 | Martindale . |
| 1,024,358 | 4/1912 | Pierce et al. . |
| 1,088,295 | 2/1914 | Quick et al. . |
| 1,151,441 | 8/1915 | Critchfield . |
| 1,170,960 | 2/1916 | Canterbury . |
| 2,072,558 | 3/1937 | Hunt ........................................... 56/334 |

Primary Examiner—Terry Lee Melius
Attorney, Agent, or Firm—Sughrue, Mion, Zinn, Macpeak & Seas, PLLC

[57] ABSTRACT

A fruit picker includes a rigid, hollow sleeve having an opening at the top end thereof, and a fruit engaging mechanism connected to the sleeve at the top end for engaging a piece of fruit. The fruit engaging mechanism includes a string attached at one end thereof to a first point on the sleeve, the string passing through a hole provided in the sleeve at a second point which is separated from the first point by a predetermined arcuate distance along a side of the sleeve. The opposite end of the string extends down the outside of the sleeve so that it can be grasped by a user of the fruit picker. The string defines, in conjunction with the side of the sleeve, a variable size opening in which the piece of fruit to be picked is received. The fruit engaging mechanism further includes a biasing mechanism which is slidably attached to the string for biasing the string away from the first and second point so as to increase the size of the variable size opening. After the piece of fruit has passed through the variable size opening, the user pulls on the opposite end of the string to thereby reduce the size of the variable size opening and trap the piece of fruit within the sleeve. Thereafter, downward movement of the sleeve causes the fruit engaging mechanism to sever the piece of fruit from the tree branch.

14 Claims, 4 Drawing Sheets

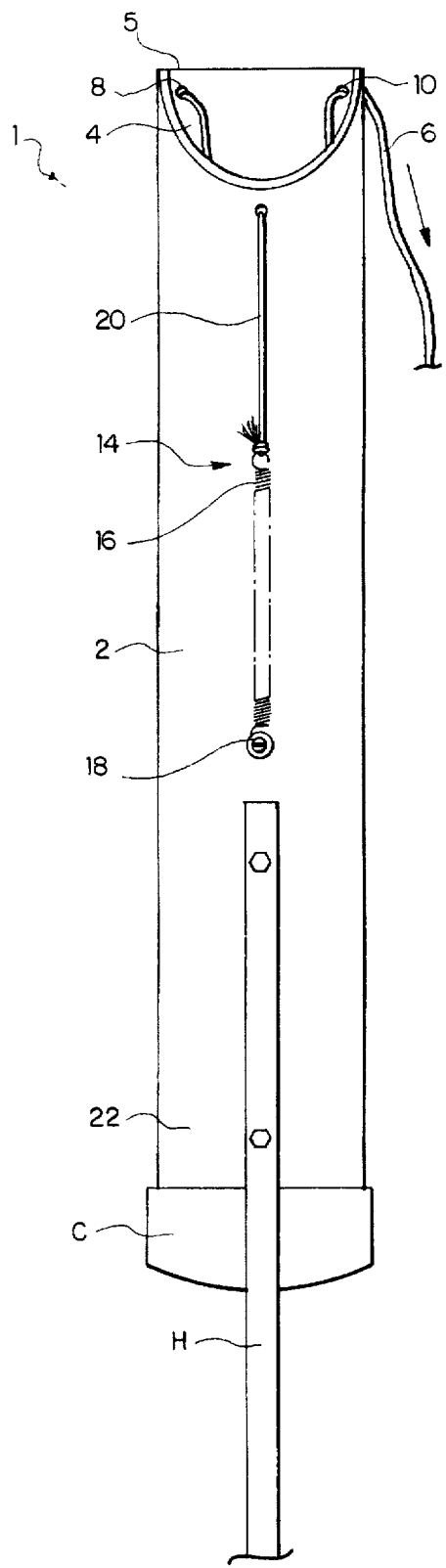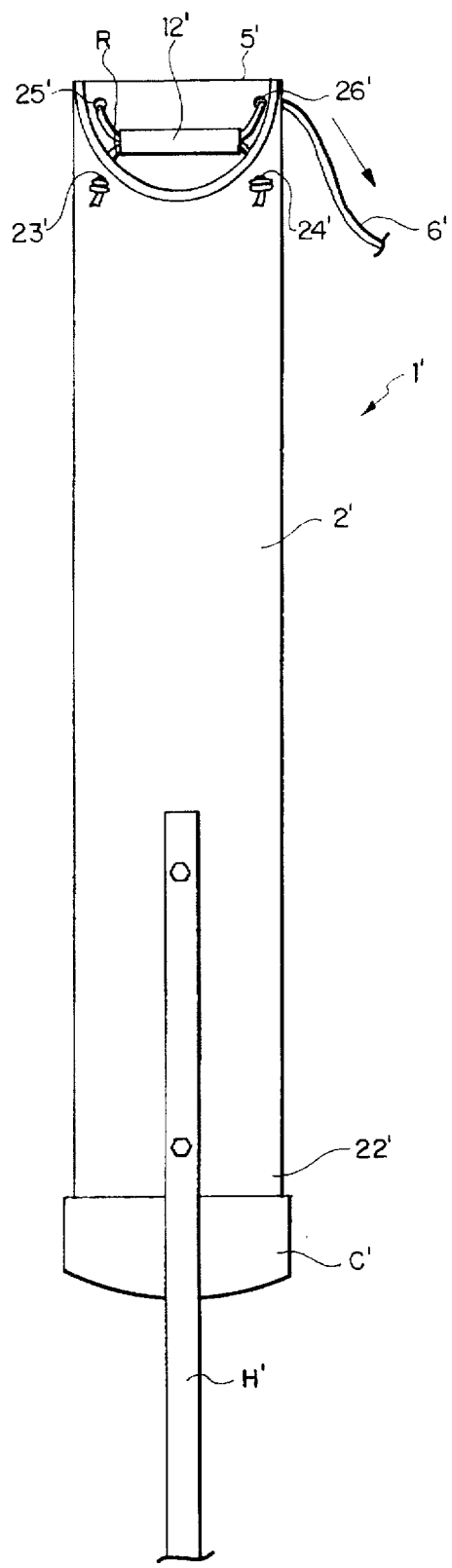

HIGH-REACH FRUIT PICKER

BACKGROUND OF THE INVENTION

1. Field of the Invention

This invention relates to a fruit picker which is capable of picking various types of fruit from hard-to-reach branches.

2. Background

Manually operated fruit pickers are known in the art. However, most of the conventional fruit pickers are either relatively complicated in design or difficult to use. For example, U.S. Pat. No. 1,024,358 issued to Pierce et al., U.S. Pat. No. 1,151,441 issued to Critchfield and U.S. Pat. No. 1,088,295 issued to Quick et al., each include sophisticated linkage mechanisms which are movable in order to pick the fruit from the tree. As a result, each of these fruit pickers is relatively sophisticated in design and, therefore, would be rather expensive to manufacture. U.S. Pat. No. 589,009 discloses a fruit picker which has a relatively simple design including a ring-like member which is used to trap the piece of fruit so that the fruit can be separated from its branch. However, it appears as though the fruit picker disclosed therein would be rather difficult to operate and, more particularly, may be relatively ineffective in picking fruit in a consistent manner. Finally, U.S. Pat. No. 1,170,960 issued to Canterbury merely discloses a fruit gathering sleeve and receptacle. According to this patent, the user actually picks the fruit with his hand and drops the fruit in the sleeve so that it drops into the receptacle. As such, it is readily apparent that the device disclosed in the Canterbury patent is incapable of picking fruit from high branches.

U.S. Pat. Nos. 186,921 (Boyd) and 370,004 (Bruner) are of background interest with respect to the present invention.

SUMMARY OF THE INVENTION

It is an object of the present invention to overcome the deficiencies of the conventional fruit picker by providing a relatively stable design which is easy to manufacture and use and effective in picking fruit from high branches.

This object is achieved by a fruit picker including a rigid, hollow sleeve having an opening at a top end thereof; and a fruit engaging means connected to the sleeve at the top end for engaging a piece of fruit. According to the invention, the engaging means includes a string attached at one end thereof to a first point on the sleeve and passing through a hole provided in the sleeve at a second point which is separated from the first point by a predetermined arcuate distance along a side of the sleeve. The opposite end of the string extends down the outside of the sleeve so that it can be grasped by a user of the fruit picker. Further, the string defines in conjunction with the side of the sleeve, a variable size opening in which the piece of fruit to be picked is received. The fruit engaging means further includes a biasing means which is slidably attached to the string for biasing the string away from the first and second point so as to increase the size of the variable size opening. After the piece of fruit has passed through the variable size opening, the user pulls on the opposite end of the string to thereby reduce the size of the variable size opening and trap the piece of fruit within the sleeve. Thereafter, downward movement of the sleeve causes the fruit engaging means to sever the piece of fruit from the tree branch.

Further, the fruit engaging means also includes a tubular member to which the string passes between the first and second points. The biasing means is attached directly to the tubular member so that the tubular member thereby slidably attaches the biasing means to the string. Additionally, the tubular member also facilitates removal of the piece of fruit from the branch without causing any damage to the fruit.

According to one of the embodiments, the biasing means includes a spring which is connected at one end thereof to the sleeve and at the opposite end thereof to the tubular member via a string. Alternatively, the biasing means includes a rubber band which passes through the tubular member and which is secured at opposite ends thereof within the sleeve.

According to the invention, the sleeve can be made of a polyvinyl chloride (PVC) pipe or an aluminum pipe having a diameter which is dependent upon the size of fruit to be picked. Specifically, for larger fruit such as apples, it would be necessary to provide a sleeve having a relatively large diameter. In contrast, for picking fruit such as peaches or plums having a relatively small diameter, the sleeve can have an attendantly smaller diameter.

According to another aspect of the invention, a sack is secured to the bottom end of the sleeve such that the picked fruit can drop into the sack and be accumulated therein. Alternatively, a flexible tube can be attached to the bottom end of the sleeve for serving as a means of transferring the picked fruit from the fruit picker into a container which is either carried by the user or operator or by another person or placed on the ground. The flexibility of the tube allows the fruit to be dropped into the remote container. The resultant fruit picker is advantageous in that it is relatively inexpensive to manufacture and yet effective in picking fruit and easy to operate.

BRIEF DESCRIPTION OF THE DRAWINGS

Other features and advantages of the present invention will be apparent from the following description taken in connection with the accompanying drawings, wherein:

FIG. 4 is a vertical elevational view of the fruit picker according to the first embodiment;

FIG. 5 is a vertical elevational view of the alternative embodiment; and

DETAILED DESCRIPTION OF THE PREFERRED EMBODIMENTS

Figure 1:
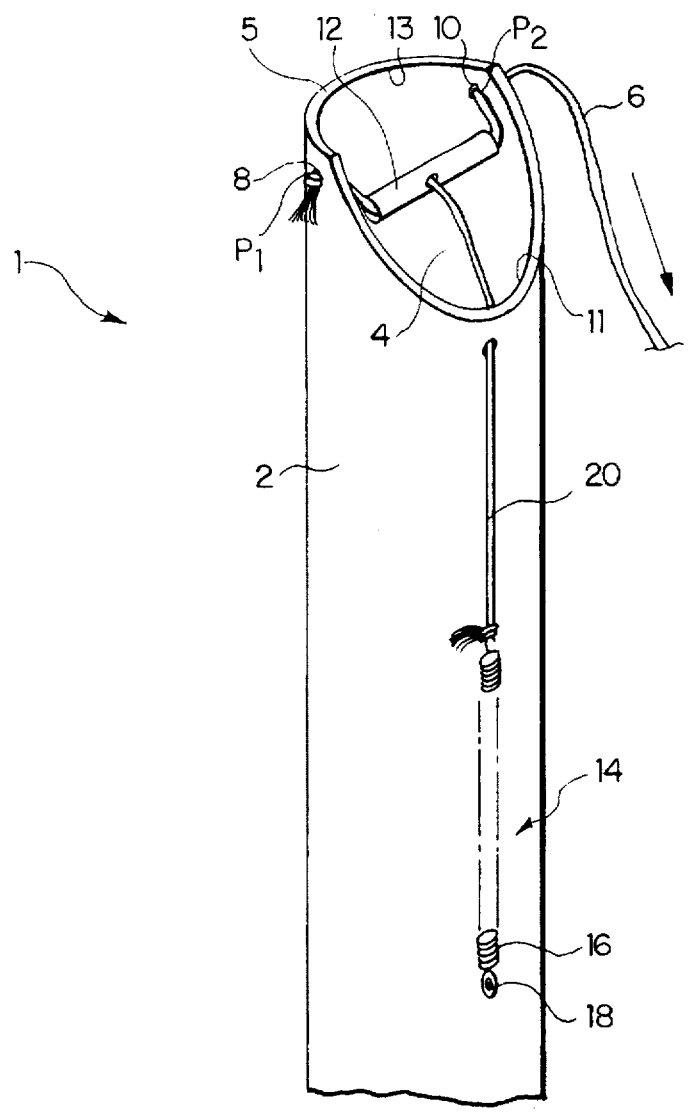
FIG. 1 is a perspective view of the fruit picker according to the present invention.
Figure 2:
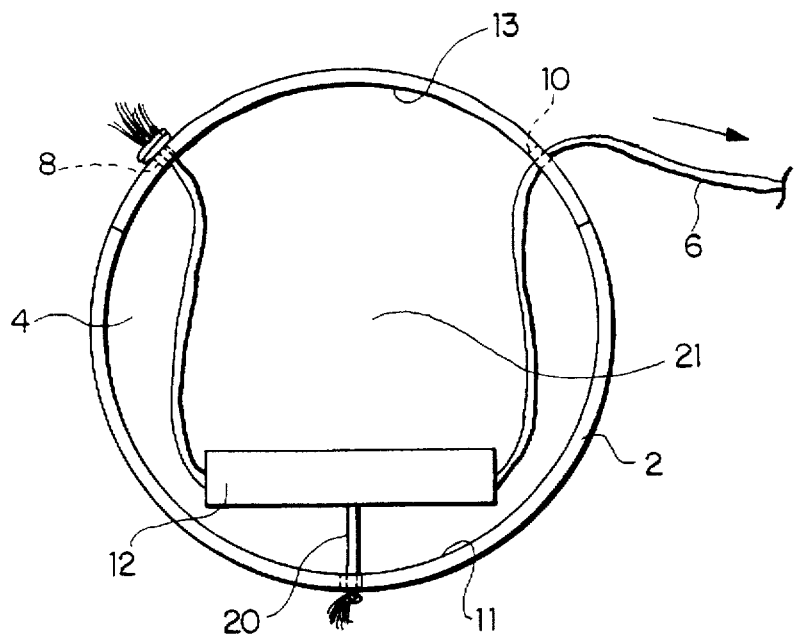
FIG. 2 is a top view of the fruit picker according to a first embodiment.

Referring to FIG. 1, the fruit picker 1 includes a hollow sleeve-like member 2 (hereinafter referred to simply as "sleeve 2") having an opening 4 at a top end 5 thereof. The opening 4 is bevelled at a front side or wall 11 of the sleeve 2 in order to allow the operator to view the fruit to be picked. Alternatively, a translucent plastic or glass tube could be used for facilitating viewing of the fruit. A cord or string 6 is secured at point $P_1$ of the sleeve at the top end 5, as illustrated in FIG. 1. For example, a hole 8 may be formed through the sleeve 2 at point $P_1$, with the string 6 passing through the hole 8 and having a knot tied exteriorly of the sleeve. The string 6 passes across the opening 4 and through a hole 10 at point $P_2$ and extends downwardly along the outside of the sleeve 2. The hole 8 at point $P_1$ and the hole 10 at point $P_2$ are separated by a predetermined arcuate distance along a back wall 13 of the sleeve 2. The predetermined arcuate distance is determined by an arc of preferably, but not necessarily, less than 180°. In proceeding from point $P_1$ to point $P_2$, the string 6 passes through a tubular member 12, as illustrated. A biasing mechanism 14 is provided for biasing the tubular member 12 to the side or front wall 11 of the sleeve 2 which is opposite to the points $P_1$ and $P_2$, as illustrated in FIG. 1. According to a first embodiment as shown in FIGS. 1, 2 and 4, the biasing mechanism 14 includes a spring 16 which is fixedly secured to the outside of the sleeve 2 by screw 18. The opposite end of the spring 16 is connected via a string 20 to the center of the tubular member 12, as also illustrated in FIG. 1.

The importance of the biasing member 14 is to ensure that the tubular member 12 is drawn to the front wall 11 such that the opening 21 defined by the string 6 and the back wall 13 of the sleeve is maximized. In this manner, a piece of fruit to be picked can be received in the opening 21, as best seen in FIG. 2. Thereafter, the user pulls on the bottom end of the string 6 to thereby force the tubular member 12 towards the back wall 13 of the sleeve 2 against the force of the biasing mechanism 14 to thereby reduce the size of the opening 21 and trap the fruit inside the sleeve 2. When the user pulls the sleeve 2 downwardly, the fruit is thereby severed from the tree limb and drops downwardly into the sleeve 2.

Figure 3:
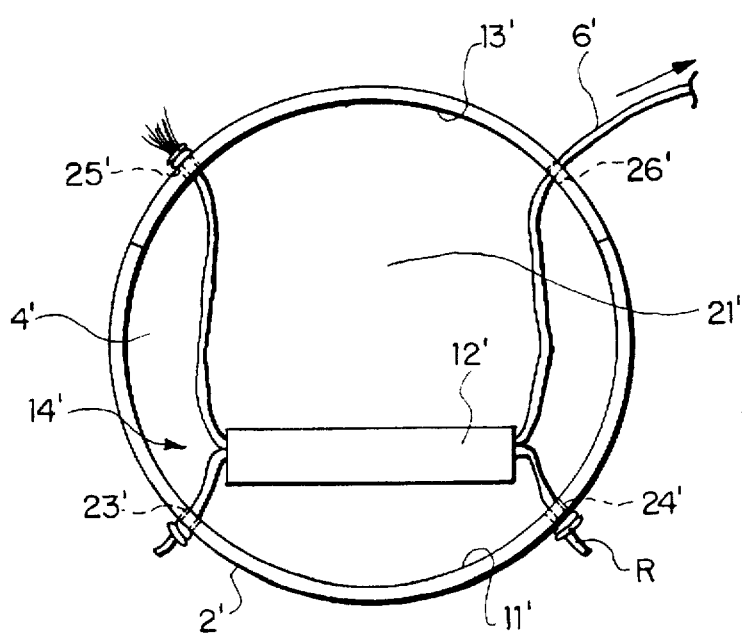
FIG. 3 is a top view of the fruit picker showing an alternative embodiment.

According to a second embodiment as shown in FIGS. 3 and 5, the biasing mechanism 14' includes an elastic band R, such as a rubber band, which extends across the bevelled opening 4' of the sleeve 2' and is secured at opposite ends thereof either to the inside of the sleeve or by passing through holes 23' and 24' formed through the sleeve 2', with the elastic band R having knots tied exteriorly of the sleeve 2'. The ends of the elastic band R could alternatively be secured by screws or other conventional fasteners. As best seen in FIG. 3, the elastic band R tends to bias the tubular member 12' toward the front wall 11' of the sleeve 2'.

In the second embodiment, the string 6' has one end fastened to the sleeve 2' such as by passing the end of the string through a hole 25' and forming a knot on the end of the string (see FIG. 3). The string 6' then also passes through the tubular member 12' together with the elastic band R and the opposite end of the string exits through another hole 26' which is separated from the hole 25' by a predetermined arcuate distance which is determined by an arc of preferably less than 180° as shown in FIG. 3.

In operation, a piece of fruit to be picked is received in the opening 21' of the fruit picker according to the second embodiment as best seen in FIG. 3. Thereafter, the user pulls on the bottom end of the string 6' thereby to force the tubular member 12' toward the back side or wall 13' of the sleeve 2' against the force of the biasing mechanism 14' which takes the form of the elastic band R to thereby reduce the size of the opening 21' and trap the fruit inside the sleeve 2'. Again, when the user pulls the sleeve 2' downwardly, the fruit is thereby severed from the tree limb and drops downwardly into the sleeve 2'.

The fruit picker according to either the first or second embodiment may be mounted on a pole H, H' which can take the form of a simple wooden pole of any length or a telescoping pole. The pole H, H' can be attached to the sleeve 2, 2' by means of any conventional fastening means including clamps, bands, brackets, bolts, tapes, or the base of the sleeve can have a mounting receptacle for the pole.

Figure 6:
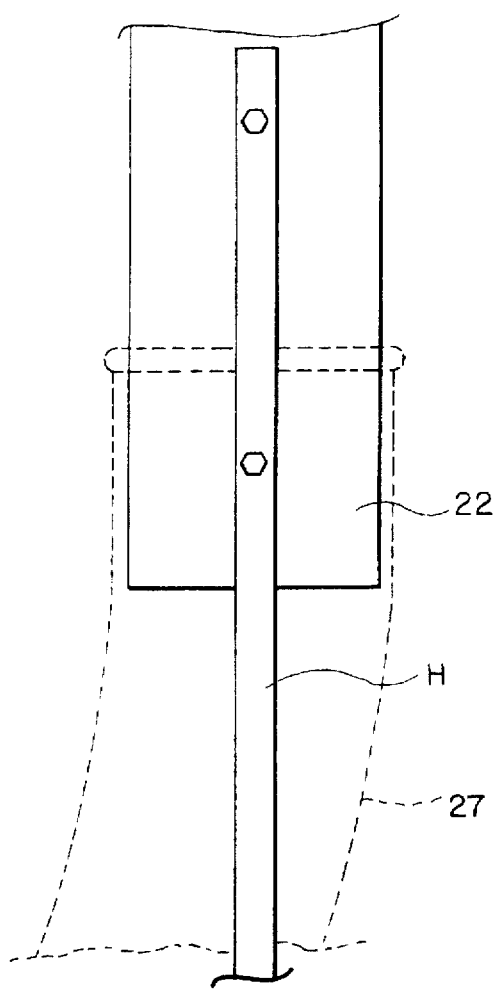
FIG. 6 is a fragmentary vertical elevational view of a still further embodiment.

According to the preferred embodiment of the invention, the bottom of the sleeve 2 has an opening to which a sack may be attached. Therefore, the picked fruit which drops through the sleeve is accumulated in the sack. Of course, it is understood that alternative arrangements could be used. For example, instead of using a sack, it would be possible to use a flexible tube 27 for transferring the picked fruit from the fruit picker 1 into a container (see FIG. 6). Alternatively, the bottom 22, 22' of the sleeve 2, 2' could be closed, for example, by a cap C, C' (see FIGS. 4 and 5) so that the fruit remains contained inside the sleeve.

According to the invention, the sleeve can be manufactured out of plastic such as a PVC pipe or metal such as aluminum. Moreover, the diameter of the sleeve 2 is dependent upon the size of fruit to be picked. Thus, for a relatively large fruit such as apples, it is necessary to have sleeve 2 having a relatively large diameter. In contrast, when picking smaller fruits such as plums or peaches, a smaller diameter sleeve 2 is preferred.

It is contemplated that numerous modifications may be made to the fruit picker of the present invention without departing from the spirit and scope of the invention as defined in the following claims.

What is claimed is:

1. A fruit picker for picking fruit from a tree branch, comprising:

a rigid, hollow sleeve having an opening at at least a top end thereof; and fruit engaging means connected to said sleeve at said top end for engaging a piece of fruit, said fruit engaging means including:

a string attached at one end thereof to a first point on said sleeve, said string passing through a hole provided in said sleeve at a second point separated from said first point by a predetermined arcuate distance along a side of said sleeve, the opposite end of said string extending down the outside of said sleeve so as to be grasped by a user of said fruit picker, said string defining in conjunction with said side of said sleeve a variable size opening for receiving the piece of fruit at least partially inside said sleeve; and biasing means attached to said string between said first and second points for biasing said string away from said first and second points so as to increase the size of said variable size opening, wherein after the piece of fruit passes through said variable size opening, the user pulls on the opposite end of said string to thereby reduce the size of said variable size opening and trap the piece of fruit within said sleeve, wherein upon downward movement of said sleeve said fruit engaging means severs said piece of fruit from the tree branch.

2. The fruit picker of claim 1, wherein said predetermined arcuate distance is determined by an arc which is less than 180 degrees.

3. The fruit picker of claim 1, wherein said fruit engaging means further comprises a tubular member through which said string passes between said first and second points.

4. The fruit picker of claim 3, wherein said biasing means is attached directly to said tubular member, said tubular member thereby slidably attaching said biasing means to said string.

5. The fruit picker of claim 4, wherein said biasing means comprises a spring connected at one end thereof to said sleeve and at an opposite end thereof to said tubular member.

6. The fruit picker of claim 5, wherein said opposite end of said spring is connected to said tubular member via another string.

7. The fruit picker of claim 3, wherein said biasing means comprises an elastic band which passes through said tubular member and which is secured at opposite ends thereof within said sleeve.

8. The fruit picker of claim 1, wherein said sleeve is a PVC pipe.

9. The fruit picker of claim 1, wherein the diameter of said pipe depends on the size of the piece of fruit to be picked.

10. The fruit picker of claim 1, further comprising a sack secured to a bottom end of said sleeve for receiving the picked pieces of fruit.

11. The fruit picker of claim 1, further comprising a flexible tube attached to a bottom end of said sleeve for transferring the picked pieces of fruit from said sleeve into a container.

12. The fruit picker of claim 1, further comprising a pole attached to said sleeve.

13. The fruit picker of claim 1, wherein said fruit engaging means is fully retained within said hollow sleeve.

14. A fruit picker for picking fruit from a tree branch, comprising:

a rigid, hollow sleeve having an opening at a top end thereof; and fruit engaging means, connected to said sleeve and fully retained in said sleeve at said top end for engaging a piece of fruit, said fruit engaging means including a cord defining a variable size opening in which the piece of fruit is received, wherein during use, the user pulls said cord to reduce the size of said variable size opening to thereby trap the piece of fruit inside said sleeve such that a downward motion of said sleeve will cause the piece of fruit to be detached from the branch.

* * * * *